United States Patent [19]

Randall

[11] 4,157,469
[45] Jun. 5, 1979

[54] PULSED NEUTRON WELL LOGGING APPARATUS HAVING MEANS FOR DETERMINING BACKGROUND RADIATION

[75] Inventor: Russel R. Randall, Houston, Tex.

[73] Assignee: Dresser Industries, Inc., Dallas, Tex.

[21] Appl. No.: 847,986

[22] Filed: Nov. 2, 1977

[51] Int. Cl.² ............................................. G01V 5/00
[52] U.S. Cl. .................................... 250/262; 250/269; 250/270
[58] Field of Search ........................ 250/262, 269, 270

[56] References Cited

U.S. PATENT DOCUMENTS 3,706,884  12/1972  Youmans ......................... 250/269 X

*Primary Examiner*—Davis L. Willis
*Attorney, Agent, or Firm*—Roy L. Van Winkle

[57] ABSTRACT

A neutron generator in a well logging instrument is periodically pulsed and has an off period between pulses of 1000 microseconds. A neutron detector is gated on at intervals of 400–500, 550–650, and 700–800 microseconds, respectively, following the termination of each burst of fast neutrons. Circuitry is provided for determining the background radiation by the equation:

$$B = \frac{N_1 \times N_3 - N_2^2}{N_1 + N_3 - 2N_2}$$

where B is the background, and $N_1$, $N_2$ and $N_3$ are the counts observed during the three gates, respectively. Circuitry is also provided for determining the macroscopic absorption ($\Sigma$) from the equation:

$$\Sigma = \frac{1}{V\Delta t} \text{Log}\left[\frac{N_1 - B}{N_2 - B}\right]$$

where V is the velocity of thermal neutrons, being a constant and $\Delta t$ represents an increment of time.

3 Claims, 7 Drawing Figures

PULSED NEUTRON WELL LOGGING APPARATUS HAVING MEANS FOR DETERMINING BACKGROUND RADIATION

BACKGROUND OF THE INVENTION

This invention relates to the art of geophysical prospecting in general, to the art of radioactivity well logging in particular, and more particularly, to improvements in such logging wherein the lifetime of neutrons in the formation is measured.

It is known in the prior art to irradiate the formations for a period of time sufficient to activate an appreciable number of nuclei of material in the formations, thereby rendering the material artificially radioactive, and at an interval of time following the cessation of the radiation to measure the artificial radioactivity. The time is related to the half-life of the activated material and is of the order of minutes or seconds for each of the common elements of the earth as are activated appreciably by this means.

In U.S. Pat. No. 3,379,882 to Arthur H. Youmans, assigned to the assignee of the present invention, there is described a system for radioactivity well logging wherein the formations are irradiated with neutrons from a periodically varying source operating at a repetition rate of the order of magnitude of hundreds or thousands of cycles per second, being thus alternately on and off for periods of hundreds of microseconds. A detecting system is synchronized with the source to operate while the source is off.

Furthermore, in U.S. Pat. No. 3,706,884 to Arthur H. Youmans, also assigned to the assignee of the present invention, there is described a system for using three detection gates following each neutron pulse and associated circuits for substantially eliminating radiation background count in pulsed neutron well logging. Although the system described in this patent has met with a high degree of success, there has sometimes been a problem when using the three-gate system because of statistical inaccuracies.

Furthermore, in U.S. Pat. No. 3,566,116 to William B. Nelligan, especially with regard to FIG. 6 of that patent, means are provided for pulsing a neutron generator three times followed by the omission of a single neutron pulse in an attempt to measure the background radiation. However, this particular system, by skipping every fourth neutron pulse, does not recognize the problem associated with disabling the pulse generator so often with its concomitant loss of neutrons. Furthermore, with such a system, the pulse generator is not likely to be disabled for a period sufficient to allow all the background radiation to die away.

Furthermore, in U.S. Pat. No. 4,041,309 to Eric C. Hopkinson, assigned to the assignee of the present invention, there is described a system of pulsed neutron logging which provides means for pulsing a neutron generator for a considerable number of times and for allowing the generator to be off for a small percentage of time compared to the number of times the generator is pulsed in order to measure the background radiation while having no substantial effect on the number of neutrons generated.

Thus, the prior art recognizes that the use of gamma ray detectors in pulsed neutron logging may on occasion necessitate a background correction. Almost all stationary measurements will require such a correction. One means of drastically increasing the observed count rates, and thus better repeatability, involves the use of a low energy discrimination of the detected gamma rays. However, such a system involving low discrimination has a background component. Thus, a better logging system results when an adequate system to account for the background is provided.

As with the prior art systems, the present invention involves count rates measured during three intervals of the decay period. However, the present invention contemplates that the background is calculated by the following equation:

$$B = \frac{N_1 \times N_3 - N_2^2}{N_1 + N_3 - 2N_2}.$$

After the background (B) is computed, the macroscopic absorption ($\Sigma$) is calculated using gates 1 and 2 ($N_1$ and $N_2$) and B by the equation:

$$\Sigma = \frac{1}{V\Delta t} \text{Log}\left(\frac{N_1 - B}{N_2 - B}\right).$$

It should be appreciated, moreover, that in 1973, in a paper presented in Poland by Edward Chrusciel, Jerzy Massalski, Krzysztof Morstin, and Antoni Starzec, at the Institute of Nuclear Techniques, Krakow, Poland, that the background level was indicated to be determined as follows:

$$N_B = \frac{N_1 N_3 - N_2^2}{N_1 + N_3 - 2N_2}.$$

However, as pointed out within that paper, the authors continued to determine $\Sigma$ by a relationship which involved the expression $$\frac{N_1 - N_2}{N_2 - N_3}$$

which is identical to that used in the U.S. Pat. No. 3,706,884. Even though having an expression for the background as used in the present invention, they did not recognize how it could be used to increase the statistical accuracy of the system.

It is therefore the primary object of the present invention to provide an improved apparatus for determining geophysical characteristics of formations surrounding boreholes;

It is still another object of the invention to provide improved means for computing and/or eliminating the effect of background radiation upon pulsed neutron logging data.

The objects of the invention are accomplished, generally, by a system which utilizes three equally-spaced detector gates following a burst of fast neutrons and which produces data proportional to $$\left(\frac{N_1 - B}{N_2 - B}\right),$$

where B is a function of $$\frac{N_1 \times N_3 - N_2^2}{N_1 + N_3 - 2N_2}.$$

These and other objects, features and advantages of the present invention will be more readily appreciated from a reading of the following detailed specification and drawing, in which.

Figure 1:
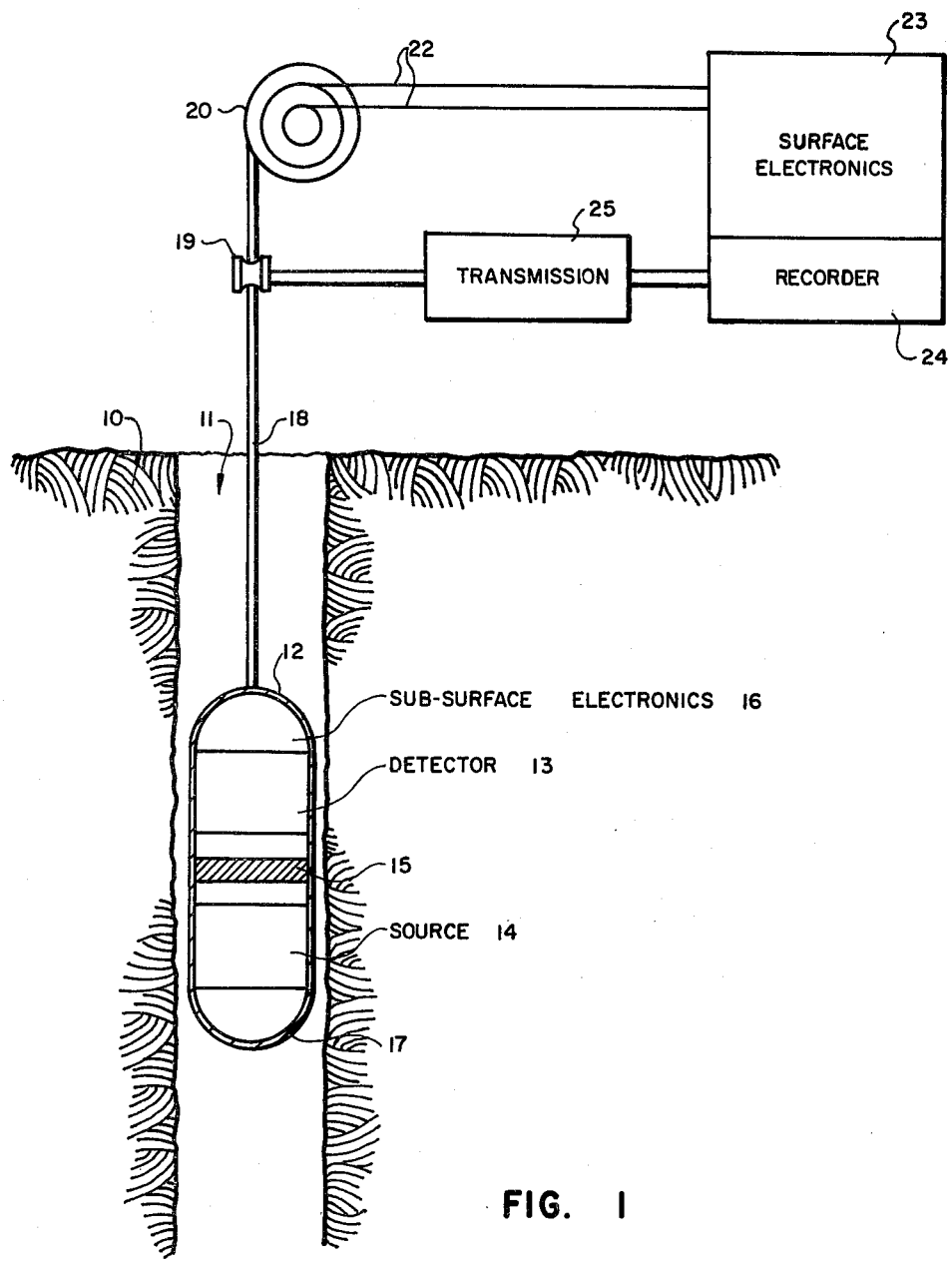
FIG. 1 is a side elevational view, partly in cross section, illustrating apparatus according to the invention, and the disposition of such apparatus relative to the strata to be examined.

Referring now to the drawing in more detail, particularly to FIG. 1, there is illustrated schematically a radioactivity well surveying operation in which a portion of the earth 10 is shown in vertical section. As well 11 penetrates the earth's surface and may or may not be cased. Disposed within the well is subsurface instrument 12 of the well logging system. Subsurface instrument 12 comprises a detecting system 13 and a conventional pulsed neutron source 14 separated from the detector 13 by shielding 15. Cable 18 suspends the instrument 12 in the well and contains the required conductors for electrically connecting the instrument 12 with the surface apparatus. The cable is wound on or unwound from drum 20 in raising and lowering the instrument 12 to traverse the well.

In making a radioactivity log of the well, instrument 12 is caused to traverse the well. Thereby neutrons from source 14 irradiate the formations surrounding the borehole and radiations influenced by the formations are detected by the detecting system 13. The resultant signals are sent to the surface through cable 18. Through slip rings 21 on the end of the drum, the signals are conducted by means of conductors 22 to the surface electronics 23, where such signals are processed and then recorded on the recorder 24 as explained in more detail hereinafter. Recorder 24 is driven through a transmission 25 by measuring reel 19 over which the cable 18 is drawn so that recorder 24 moves in correlation with depth as the instrument 12 traverses the well. The elements are shown diagrammatically, and it is to be understood that the associated circuits and power supplies are provided in a conventional manner. It is also to be understood that the instrument housing 17 will be constructed to withstand the pressures and mechanical and thermal abuses encountered in logging a deep well and provide adequate space within it to house the necessary apparatus and permit the transmission of radiation through it. The subsurface signals are processed in the subsurface electronics 16, described in greater detail hereinafter.

As is well known in the art of radioactivity well logging, the formation 10 is irradiated by neutrons from the neutron source 14, for example, a D-T accelerator. These neutrons participate in elastic and inelastic collisions with the atoms contained in the various layers of the formation. The secondary radiation resulting from bombardment by the primary radiation in the form of neutrons from the source 14 is detected by the radiation detector 13.

The measurement of the decline of the thermal neutron population provides a means for determining a property of the material surrounding the borehole which is a definite, calculable, physical parameter, the macroscopic capture cross section of the formation.

Figure 2:
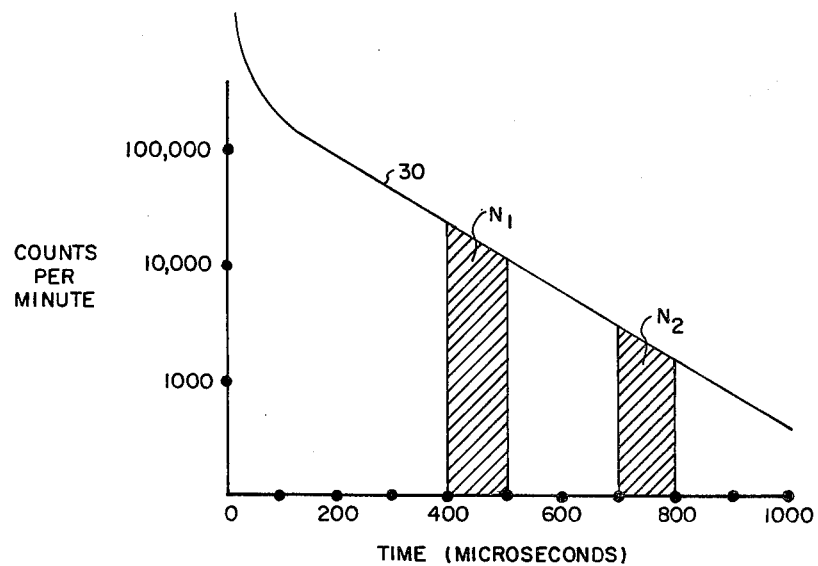
FIG. 2 is a schematic representation of a characteristic decay of the thermal neutron population following a burst of fast neutrons within a well.

FIG. 2 illustrates a counting rate curve 30 which is exemplary of the decline of the thermal neutron population in the formations following each neutron source pulse. The counting rates $N_1$ and $N_2$ are taken, respectively, during the periods of 400–500 and 700–800 microseconds after each neutron pulse. However, such times are merely illustrative of providing two gated detection intervals during the decline of the thermal neutron population.

Figure 3:
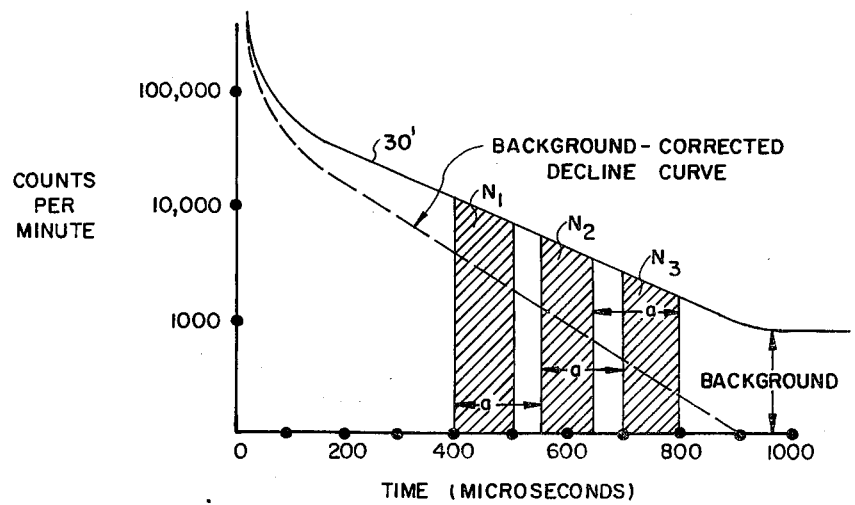
FIG. 3 is a schematic representation of three gated intervals within the thermal neutron decay curve.

FIG. 3 illustrates the curve 30', similar to curve 30 in FIG. 2, but having three gated detection intervals with respective counting rates $N_1$, $N_2$ and $N_3$. FIG. 3 depicts the observed effect when a "background" is present. This background may, for example, be due to the detection of gamma rays resulting from $N^{16}$ induced in the rocks and borehole fluids by interaction with neutrons from the source. Since $N^{16}$ is a radioactive isotope with a half life of 7.3 seconds, it is present in substantially equal abundance throughout the measurement cycle and as such constitutes, effectively, a constant background. Similarly, artificial radioactivity may be induced in the scintillation crystal of the detector 13 or in other elements of the borehole or the formations.

When the radiation detector responds to these radiations, either by design or inadvertently, the observed slope of the decay curve 30' of FIG. 3 is different from the true slope which would be observed in the absence of such background. It is one object of the present invention to determine the true slope of the decay curve of the neutron population despite the presence of background radiation. As will be more fully described, this can be accomplished by measuring during each of three gates $N_1$, $N_2$ and $N_3$, as depicted in FIG. 3.

It is to be understood, however, that the specific time periods, shown as "a" in FIG. 3, for the three gated intervals are for purposes of illustration only and are not to be construed as limiting the invention.

Figure 4:
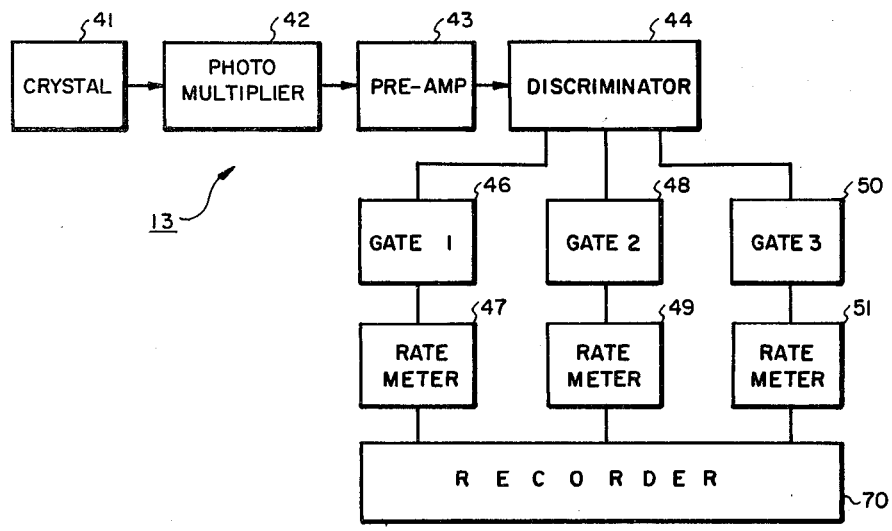
FIG. 4 is a block diagram illustrating apparatus for providing three gated detection intervals following each neutron pulse.

FIG. 4 illustrates the radiation detection system 13 in block diagram. A crystal 41, for example CsI or NaI, can be used as a scintillation crystal. LiI, a neutron detector, is also acceptable. For purposes of this apparatus and circuitry, however, it is desirable that the crystal used have an output proportional to the energy of a gamma ray photon received. A crystal of this type emits a photon of light energy when a gamma ray photon impinges upon it, and the energy of the light photon is proportional to the energy of the incoming gamma ray photon.

The scintillation from the crystal 41 is coupled to the photomultiplier tube 42 which produces electrical pulses proportional to the intensity of the light produced by the crystal. The crystal 41 and photomultiplier 42 can be fabricated, if desired, according to U.S. Pat. No. 3,254,217 to Arthur H. Youmans. These electrical pulses pass to the conventional preamplifier stage 43. The preamplifier 43 is connected to the discriminator 44 which is set to respond to pulses of a preselected magnitude. If desired, the discriminator 44 can be built in accordance with FIG. 4.1, page 204 of *Electronics, Experimental Techniques,* Elmore and Sands, published by the McGraw Hill Book Company, Inc. in 1949.

The gates 46, 48 and 50, respectively, for example, built in accordance with gating circuitry such as is depicted in U.S. Pat. No. 3,358,142 to Eric C. Hopkinson, et al., connect the discriminator 44 output to conventional counting rate meters 47, 49 and 51, the outputs of which may be connected to a recorder 70. If desired, the counting rate meters 47, 49 and 51 can be constructed in accordance with FIG. 3 of U.S. Pat. No. 3,538,329 to Francis J. Niven, Jr. The recorder 70 is conventional, for example, a film strip recorder. Gates 1, 2 and 3 (elements 46, 48 and 50) are synchronously driven by signals from the neutron source 14 to provide predetermined gating intervals, for example, such as those illustrated in FIG. 3.

Figure 5:
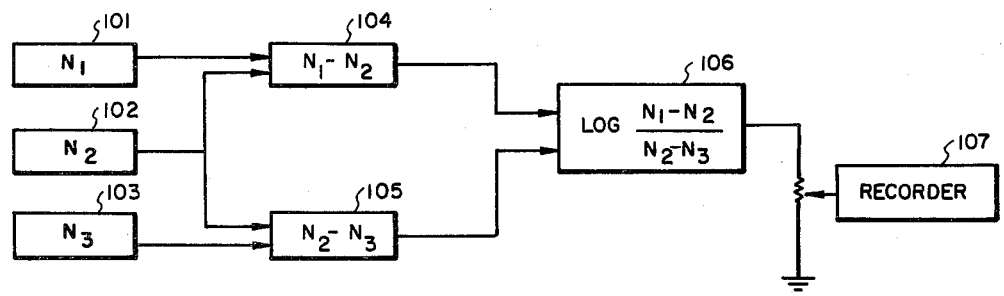
FIG. 5 is a block diagram illustrating prior art circuitry for deriving a signal proportional to $$\frac{N_1 - N_2}{N_2 - N_3};$$

FIG. 5 shows in block form the means for deriving $\Sigma$ in a logging operation, for example, as in the prior art U.S. Pat. No. 3,706,884. In the figure disclosed, blocks 101, 102 and 103 represent the output of counting rate meters responsive, respectively, to the radiation induced pulses detected during gates $N_1$, $N_2$ and $N_3$. Block 104 represents a subtraction circuit which derives a signal proportional to $N_1-N_2$. Block 105 derives a signal proportional to $N_2-N_3$. Such subtraction circuits are conventional, for example, as are found in chapter 5 of *Electronic Analog Computers* by Korn and Korn, published by the McGraw-Hill Book Company in 1956. Block 106 represents circuit means which derives a signal proportional to the logarithm of $$\frac{N_1 - N_2}{N_2 - N_3}.$$

The circuit for providing such a logarithmic signal is described, for example, in U.S. Pat. No. 3,534,401 to P. H. Karvellas et al. Block 107 represents a recorder where a signal proportional to the output of 106 is recorded in correlation with depth of the logging instrument. Such recorders are conventional, for example, a strip chart recorder. It is to be understood that this recorded signal will be adjusted in magnitude so as to provide a recorded indication of variations in $\Sigma$ in accordance with a preselected calibration scale.

Figure 6:
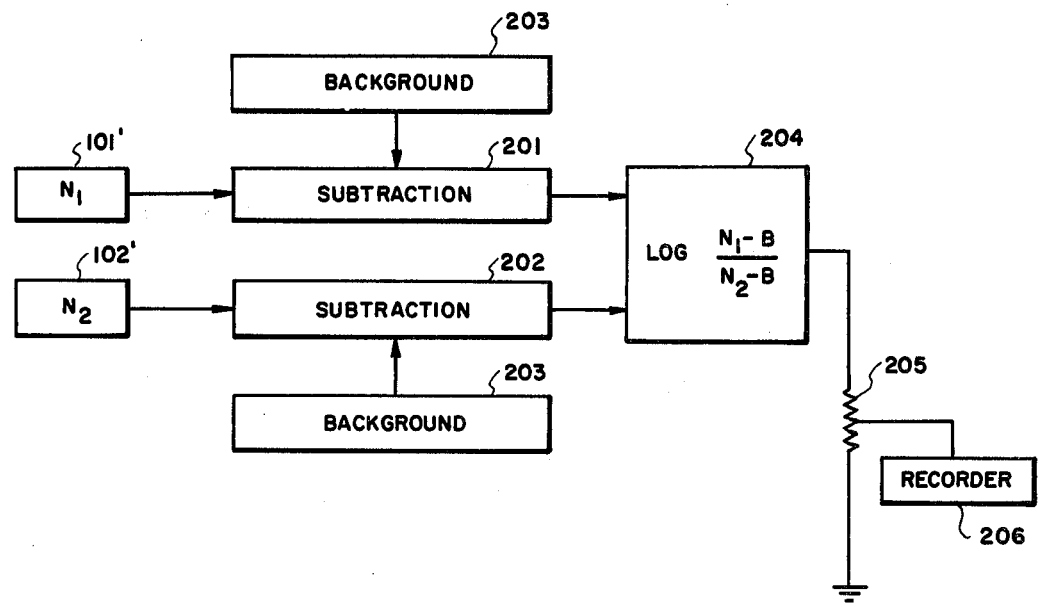
FIG. 6 illustrates in block diagram the circuitry according to the present invention for producing data which is statistically more accurate than those produced in the prior art.

FIG. 6 shows in block diagram the circuitry for deriving $\Sigma$ in a logging operation according to the present invention. In this figure, blocks 101' and 102' represent the output of counting rate meters responsive, respectively, to the radiation induced pulses detected during gates $N_1$ and $N_2$. Blocks 201 and 202 are conventional substraction circuits, coupled respectively to the outputs of the blocks 101' and 102'. The subtraction circuit 201 has as another input the output of the box entitled "BACKGROUND" and generally bearing the legend 203. A similar such background circuit 203 is connected to the second input of the subtraction circuit 202. The outputs of the two subtraction circuits 201 and 202 are connected into a logarithmic circuit 204 which produces a signal based upon the logarithm of $$\frac{N_1 - B}{N_2 - B}.$$

where "B" represents the background. The output of the logarithmic circuit 204 is connected through a potentiometer 205 to a recorder 206. The background circuits 203 are described in more detail hereinafter with respect to FIG. 7. As discussed heretofore with respect to the prior art circuit of FIG. 5, the logarithmic circuit 204 can be fabricated in a manner similar to that of logarithmic circuit 106.

Figure 7:
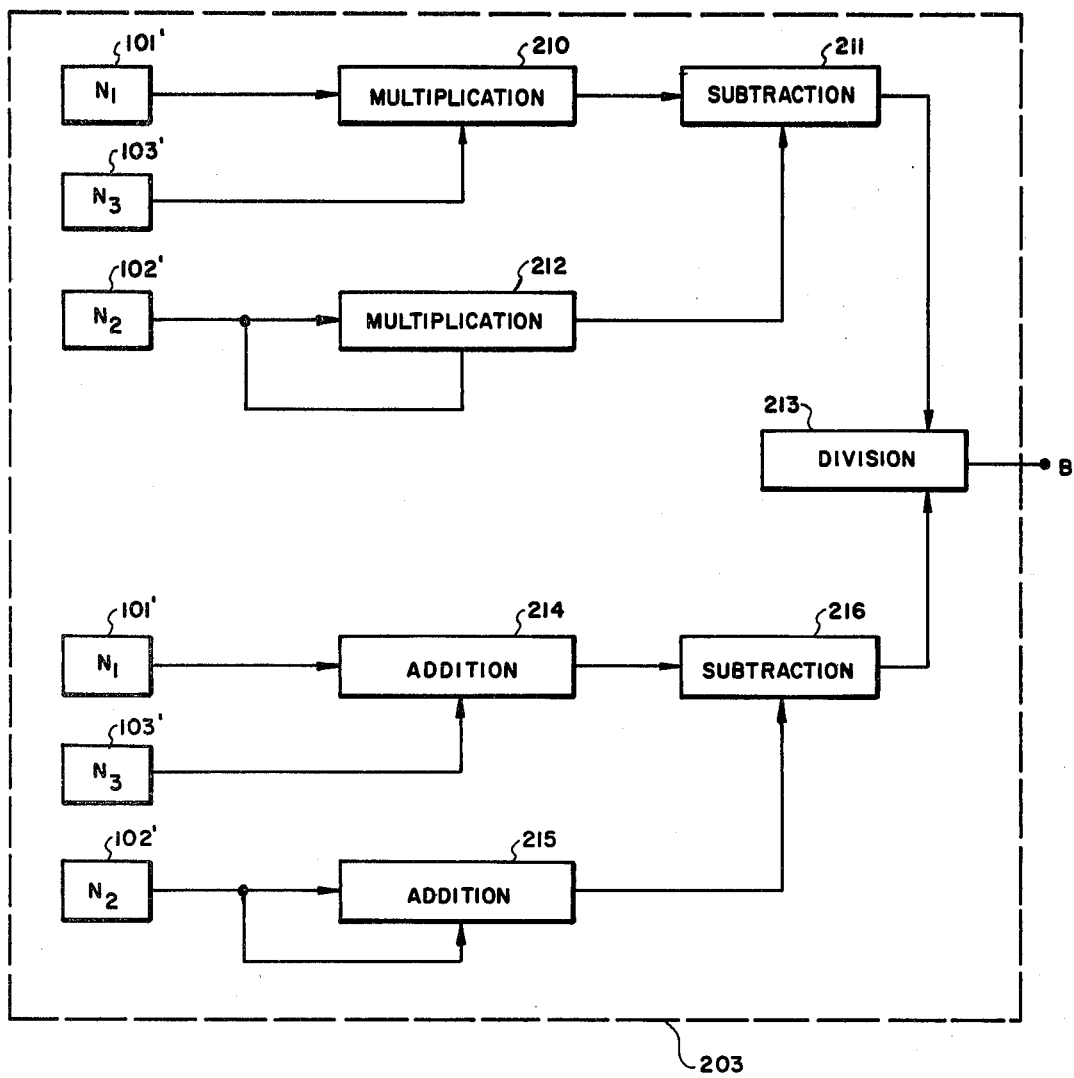
FIG. 7 illustrates in block diagram the circuitry for producing the background information in accordance with the present invention.

Referring to FIG. 7, the background circuits 203 are illustrated in greater detail. The blocks 101', 102' and 103', corresponding to the output of the count rate meters $N_1$, $N_2$ and $N_3$, are connected into various multiplication, addition, subtraction, and division circuitry to produce the background which is also identified by the letter "B". Specifically, the output of the block 101' is multiplied by the output of the block 103' in the multiplication circuit 210, the product of which is connected into one input of a subtraction circuit 211. The output of the block 102' is squared, in effect multiplied by itself, by the multiplication circuit 212 whose output is also connected into the subtraction circuit 211. The output of the subtraction circuit 211 is coupled into a division circuit 213. The block 101' and the block 113' are connected to the inputs, respectively, of an addition circuit 214. The output of the block 102' is coupled into two inputs of the addition circuit 215 to thus create a signal twice as large as originally appearing from the box 102'. The output of the addition circuit 215 is coupled into a subtraction circuit 216, as is the output of the addition circuit 214, and the output of the subtraction circuit 216 is coupled into the division circuit 213. The output of the division circuit 213 is labeled as "B", indicative of the background data which is subtracted from the outputs of the boxes 101' and 102' in FIG. 6.

In understanding the advantage of the circuitry illustrated in FIGS. 6 and 7, as compared to that of the prior art circuit illustrated in FIG. 5, it should be appreciated that the prior art of FIG. 5 produces $\Sigma$ based upon the following relationship:

$$\Sigma = K \operatorname{Log}\left(\frac{N_1 - N_2}{N_2 - N_3}\right),$$

where K is a constant. However, using the well-known relationship of $$\alpha_\Sigma = \sqrt{\alpha K^2 + \alpha u^2}, \text{ where "}u\text{" is the ratio factor,}$$

where "u" is the ratio factor, for the standard deviation involving the propagation of errors, then $$\alpha_u = \frac{K}{\Sigma} \sqrt{\frac{N_1 + N_2}{(N_1 - N_2)^2} + \frac{N_2 + N_3}{(N_2 - N_3)^2}},$$

where $\alpha$ is one standard deviation. From actual data taken where $N_1=1929$, $N_2=914$ and $N_3=496$, and where gates 1, 2 and 3 are 400-600, 600-800 and 800-1000 usec, respectively, $$\alpha_u = \frac{K}{\Sigma} \sqrt{\frac{1920 + 914}{(1920 - 914)^2} + \frac{914 + 496}{(914 - 496)^2}}$$

$$= \frac{K}{\Sigma} \sqrt{0.0028002 + 0.00800798}$$

$$= \frac{K}{\Sigma} (10.4\%)$$

On the other hand, when using the system according to the invention, $$\Sigma = K \operatorname{Log}\left(\frac{N_1 - B}{N_2 - B}\right);$$

$$\alpha_\Sigma = \sqrt{\alpha_K^2 + \alpha_u^2};$$

and $$\alpha_u = \frac{K}{\Sigma} \sqrt{\frac{N_1 + B}{(N_1 - B)^2} + \frac{N_2 + B}{(N_2 - B)^2}}.$$

Using the same data as with the prior art example above, $$\alpha_u = \frac{K}{\Sigma} \sqrt{\frac{1920 + 200}{(1920 - 200)^2} + \frac{914 + 200}{(914 - 200)^2}}$$

$$= \frac{K}{\Sigma} (5.4\%).$$

Comparing the two systems, the invention produces a decrease in statistical error by approximately a factor of two.

Thus there has been described and illustrated herein the preferred embodiment of apparatus according to the present invention. However, those skilled in the art should appreciate obvious modifications to the embodiment shown. For example, while the three detector gates are preferably of equal duration, they may be immediately adjacent each other or may be equally spread apart. Furthermore, it should be appreciated that the present system, in accordance with the invention, produces less statistical variation and has a substantially increased degree of reproducibility.

The embodiments of the invention in which an exclusive property or privilege is claimed are defined as follows:

1. Apparatus for radioactivity well logging, comprising:
    an elongated instrument adapted to traverse an earth borehole;
    a source of neutrons within said instrument;
    radiation detection means within said instrument in spaced relation to said source, said detection means including means to generate electrical signals indicative of such detected radiation;
    first, second and third gates within said instrument connected to the output of said detection means; and
    means within said instrument to repetitively pulse said neutron source and to trigger said first, second and third gates in timed relationship with the pulsing of said neutron source, said means being characterized by electrical circuits connected to the outputs of said first, second and third gates adapted to generate additional electrical signals functionally related to $$K \operatorname{Log}\left[\frac{N_1 - B}{N_2 - B}\right],$$

where K is a constant, $N_1$ is a function of the number of radioactivity counts detected during the first gate, $N_2$ is a function of the number of radioactivity counts detected during the second gate and B is a function of the background radiation.

2. The apparatus according to claim 1, including in addition thereto, circuit means for generating electrical signals indicative of the background B based upon the relationship:

$$B = \frac{N_1 \times N_3 - N_2^2}{N_1 + N_3 - 2N_2},$$

where $N_3$ is a function of the number of radioactivity counts detected during the third gate.

3. The apparatus according to claim 2, wherein the first, second and third gates are equal in time duration and the time difference between the first and second gates is equal to the time difference between the second and third gates.

* * * * *